(12) United States Patent
Steinle

(10) Patent No.: US 8,797,611 B2
(45) Date of Patent: Aug. 5, 2014

(54) ILLUMINATION ASSEMBLY

(71) Applicant: Hewlett-Packard Development Company, L.P., Fort Collins, CO (US)

(72) Inventor: Michael J. Steinle, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/711,884

(22) Filed: Dec. 12, 2012

(65) Prior Publication Data

US 2014/0160536 A1 Jun. 12, 2014

(51) Int. Cl.
*H04N 1/04* (2006.01)

(52) U.S. Cl.
USPC ............ 358/475; 358/509; 358/474; 362/339

(58) Field of Classification Search
CPC .......... F21V 7/0091; F21V 5/02; F21V 5/04; F21V 5/045; G03B 15/03; F21K 9/00; F21L 4/00; F21S 48/215; F21S 48/2212; F21S 48/236; F21Y 2101/02; F21Y 2105/001; G02B 19/0028; G02B 19/0061
USPC ................ 358/474, 475, 484, 409, 482, 483; 362/339, 16, 223, 327, 311, 328, 333
See application file for complete search history.

(56) References Cited

U.S. PATENT DOCUMENTS

| | | | |
|---|---|---|---|
| 4,026,641 A | 5/1977 | Bosserman et al. | |
| 5,184,405 A | 2/1993 | Cress | |
| 5,408,095 A | 4/1995 | Atsuumi et al. | |
| 5,673,137 A | 9/1997 | Shimada et al. | |
| 5,724,172 A | 3/1998 | Ota | |
| 5,745,277 A | 4/1998 | Boku et al. | |
| 5,796,462 A | 8/1998 | Roffman et al. | |
| 5,839,823 A * | 11/1998 | Hou et al. | 362/327 |
| 5,913,599 A * | 6/1999 | Smith et al. | 362/328 |
| 5,926,411 A * | 7/1999 | Russell | 365/106 |
| 6,250,777 B1 | 6/2001 | Aoyama | |
| 6,396,616 B1 | 5/2002 | Fitzer et al. | |
| 6,425,675 B2 * | 7/2002 | Onishi et al. | 362/607 |
| 6,433,780 B1 | 8/2002 | Gordon et al. | |
| 6,467,931 B2 * | 10/2002 | Tenmyo | 362/223 |
| 6,775,077 B1 * | 8/2004 | Feng | 359/831 |
| 6,936,706 B2 * | 8/2005 | do Couto et al. | 536/23.53 |
| 6,988,800 B2 | 1/2006 | Chou et al. | |
| 6,992,846 B2 * | 1/2006 | Feng | 359/831 |
| 7,338,160 B2 | 3/2008 | Lieberman et al. | |
| 7,394,529 B2 * | 7/2008 | Song et al. | 356/71 |
| 7,400,439 B2 | 7/2008 | Holman | |
| 7,563,004 B2 * | 7/2009 | Pickard et al. | 362/309 |
| 7,682,040 B2 | 3/2010 | Stober | |
| 7,813,054 B2 | 10/2010 | Sales | |

(Continued)

OTHER PUBLICATIONS

Simske et al., High-Resolution Glyph-Inspection Based Security System, IEEE ICASSP 2010, 5 pp.

(Continued)

*Primary Examiner* — Negussie Worku

(57) ABSTRACT

A lens receives light emitted from an illumination source along an orientation in which a center of the lens is aligned with a central axis of illumination that forms an acute angle of incidence relative to a to-be-imaged surface and the lens directs the light toward the to-be-imaged surface.

19 Claims, 9 Drawing Sheets

(56) References Cited

U.S. PATENT DOCUMENTS

| | | | |
|---|---|---|---|
| 8,149,324 B2* | 4/2012 | Oikawa | 348/349 |
| 8,356,914 B2* | 1/2013 | Simon | 362/245 |
| 8,459,860 B2* | 6/2013 | Saito | 362/621 |
| 2007/0216649 A1 | 9/2007 | Lang | |
| 2009/0273727 A1 | 11/2009 | Kubota et al. | |
| 2012/0051602 A1 | 3/2012 | Adams et al. | |

OTHER PUBLICATIONS

Koshel et al., Illumination System Design in a project-based course, Society of Photo-Optical Instrumentation Engineers, 2009, 26 pp.

* cited by examiner

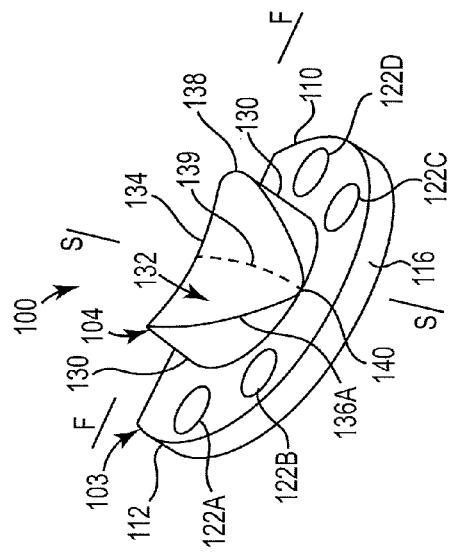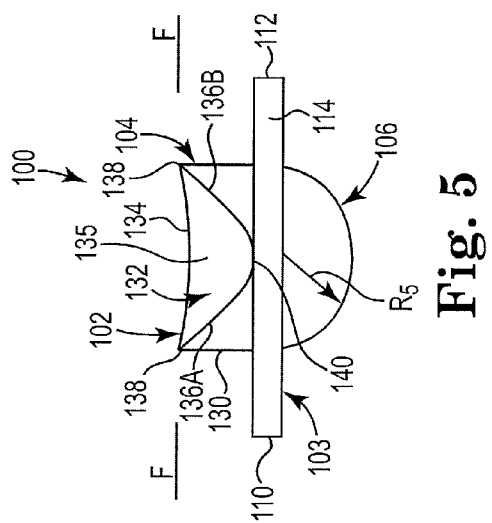

ILLUMINATION ASSEMBLY

BACKGROUND

Optical imaging typically includes illuminating a surface and imaging the illuminated surface. In some examples, the to-be-imaged surface is stationary while a source of illumination and/or imaging mechanism moves relative to the to-be-imaged surface. In other examples, the to-be-imaged surface is moved relative to a stationary source of illumination and/or a stationary imaging mechanism.

BRIEF DESCRIPTION OF THE DRAWINGS

FIG. 5 is a side view schematically illustrating a lens assembly, according to one example of the present disclosure.

FIG. 6 is a top, perspective view schematically illustrating a lens assembly, according to one example of the present disclosure.

FIG. 7 is a bottom, perspective view schematically illustrating a lens assembly, according to one example of the present disclosure.

FIG. 8 is a bottom plan view schematically illustrating a mounting flange, according to one example of the present disclosure.

DETAILED DESCRIPTION

Figure 1A:
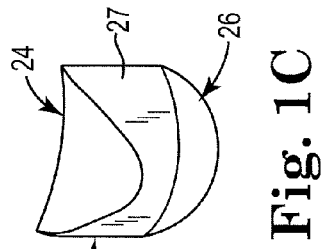
FIG. 1A is a perspective view schematically illustrating a lens, according to one example of the present disclosure.

In the following detailed description, reference is made to the accompanying drawings which form a part hereof, and in which is shown by way of illustration specific examples of the present disclosure, which may be practiced. In this regard, directional terminology, such as "top," "bottom," "front," "back," "leading," "trailing," etc., is used with reference to the orientation of the Figure(s) being described. Because components of examples can be positioned in a number of different orientations, the directional terminology is used for purposes of illustration and is in no way limiting. It is to be understood that other examples may be utilized and structural or logical changes may be made without departing from the scope of the present disclosure. The following detailed description, therefore, is not to be taken in a limiting sense.

At least some examples of the present disclosure provide for greater uniformity and efficiency in illuminating a surface to be imaged. In one example, a lens is positioned to receive light from a light source and direct the light to a surface to be imaged. In one aspect, the lens acts as a shaping element to cause an increased beam divergence in a single orientation, with the single orientation being generally perpendicular to the central axis of illumination. In another aspect, the illumination source and lens (i.e. shaping element) are aligned along the central axis of illumination at an acute angle of incidence of the central axis of illumination relative to the to-be-imaged surface. As used herein, the term acute angle should be understood as an angle that measures less than ninety degrees.

In one example, a lens for directing illumination toward the to-be-imaged surface is provided and includes a first aspheric-toric side that receives the illumination (from the illumination source) while a second opposite side of the lens completes direction of the illumination onto the to-be-imaged surface. Among other features, the aspheric-toric first side exhibits a different degree of curvature in a first orientation than in a second orientation. In one aspect, the aspheric-toric first side shapes the light (passing therethrough) to increase its divergence in just one of two orthogonal orientations. As previously described, in one example, via the aspheric-toric first side, the lens increases the beam divergence of the emitted light in the single orientation generally perpendicular to the central axis of illumination.

In some examples, the second side of the lens includes a spherical portion. However, in some examples, the second side of the lens includes other shapes. In one example, the second side of the lens includes an aspheric-toric portion in addition to the aspheric-toric portion of the first side.

In one example, the lens is part of an illumination assembly, and the source of illumination includes a light emitting diode (LED). In one aspect, the light emitting diode emits white light.

In some examples, an illumination assembly, including a lens and an illumination source, forms part of an imaging system. The imaging system includes an imaging module that obtains an image of the illuminated to-be-imaged surface. In one example, the imaging module is aligned relative to an image zone that corresponds to a portion of the to-be-imaged surface receiving the illumination and from which the image is obtained. In one example, the imaging module includes an image sensor module and in some examples, the imaging module includes a lens assembly in addition to the image sensor module. In some examples, the imaging module is formed as a single assembly while in other examples, the imaging module includes multiple separate components arranged as a single functioning mechanism.

In at least some examples of the present disclosure, the lens acts to shape or direct the illumination from the illumination source to more uniformly distribute illumination on the to-be imaged surface or the image zone. In another aspect, the particular configuration of the lens achieves greater efficiency and effectiveness in conveying the illumination produced by the illumination source to the to-be-imaged surface.

For instance, in some examples, the illumination system (lens and illumination source) is oriented to achieve an acute angle of incidence of illumination on the to-be-imaged surface. With this arrangement, if a lens according to examples of the present disclosure were not present, the emitted light would not spread enough in one orientation (e.g. y orientation) that is generally perpendicular to a central axis of illumination while more than enough light would be spread in a second orientation (e.g. x orientation) that is generally parallel to the central axis of illumination. Depending on the size of the to-be-imaged surface, this asymmetry can result in non-uniform illumination of the to-be-imaged surface. Moreover, this asymmetry hinders the efficiency of the illumination system because a portion of light is wasted by not illuminating part of the target, i.e. the to-be-imaged surface, in the y orientation. In general terms, the smaller the acute angle of incidence, the greater the asymmetry of illumination in the first and second orientations while the greater the acute angle of incidence, the less the asymmetry of illumination in the first and second orientations.

However, via inclusion of a lens according to examples of the present disclosure, such asymmetries in illumination are avoided because the lens includes features (e.g. an aspheric-toric surface) that shapes light (from an illumination source) to increase a beam divergence in just a single orientation that is generally perpendicular to the central axis of illumination. In one example, the aspheric-toric surface includes a major radius of curvature forming a concavity that receives the emitted light. The lens has a degree of curvature determined according to the particular acute angle of incidence of light on the to-be-imaged surface. Accordingly, for a lesser value acute angle of incidence, a lens having a greater degree of curvature (in the concave surface of the aspheric-toric portion) is provided to provide a greater degree of counteraction to the expected asymmetry of illumination that would otherwise occur in the absence of the light-shaping lens. Similarly, for a greater value of the acute angle of incidence, a lens having a lesser degree of curvature (in the concave surface of the aspheric-toric portion) is provided to provide a lesser degree of counteraction to the expected asymmetry of illumination that would otherwise occur in the absence of the light-shaping lens. By shaping the illumination that strikes the to-be-imaged surface in this way, the lens according to examples of the present disclosure provides greater uniformity of illumination on the to-be-imaged surface. Moreover, by directing a greater percentage of the emitted light onto the to-be-imaged surface, the efficiency of illumination (relative to total light emitted) is enhanced.

Moreover, efficiency is further enhanced by the concavity of the aspheric-toric surface that receives the emitted light from the illumination source. In particular, when an illumination source such as light emitting diodes (LED) is employed, the concavity helps to capture and redirect light that might otherwise be lost in view of the relative wide pattern of divergence of light emitted from a typical light emitting diode. In addition to reducing stray light, this arrangement increases the efficiency of the illumination assembly by using more of the light produced by the illumination source. In some examples, a reflective or white collar surrounding the outer side wall of the lens further enhances efficiency.

Among other applications, a lens according to at least some examples of the present disclosure can be deployed as part of a system or scheme to detect intentional and unintentional artifacts in printing, which can be used in fiducial marking, inspection, authentication, and forensics. In one example, the lens is used as part of an illumination assembly and/or imaging system to provide enhanced anti-counterfeiting measures via enhanced illumination and therefore, enhanced detection of intentional and unintentional printing artifacts.

These examples, and other examples, are described and illustrated below in association with FIGS. 1A-20.

FIG. 1A is a perspective view schematically illustrating a lens 20, according to one example of the present disclosure, provided to direct illumination to a surface to be imaged (i.e. a to-be-imaged surface). As shown in FIG. 1A, lens 20 includes a first side 24 and a second opposite side 25. In general terms, the first side 24 of lens 20 receives illumination, which is then directed toward the to-be-imaged surface after passing through lens 20 and out second side 25. In some examples, lens 20 includes a generally cylindrical body 27 with first side 24 and second side 25 disposed at opposite end portions of cylindrical body 27.

In one example, the first side 24 of lens 20 includes an aspheric-toric surface. In some examples, the second side 25 of the lens 22 includes a spherical surface, as later shown in association with FIG. 1C. However, in some examples, the second side 25 of the lens 22 includes a shape other than a spherical surface. In one instance, the second side 25 defines a planar surface as shown in FIG. 1A. In another instance, a second side of the lens 22 includes an aspheric-toric surface, as further described later in association with FIGS. 12A-12B.

Figure 1B:
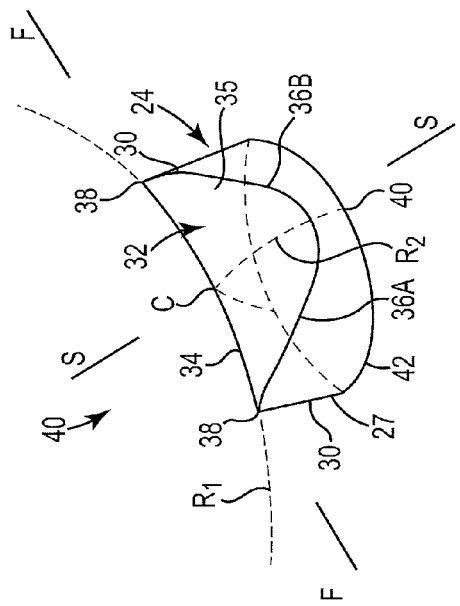
FIG. 1B is a diagram including a perspective view schematically illustrating a portion of a lens, according to one example of the present disclosure.
Figure 1C:
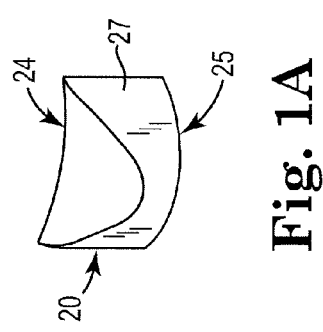
FIG. 1C is a perspective view schematically illustrating a lens, according to one example of the present disclosure.

FIG. 1B is a diagram 40 including a perspective view of a first side 24 of lens, such as lens 20 shown in FIG. 1A or lens 22 shown in FIG. 1C, according to one example of the present disclosure. For purposes of simplicity in discussion of FIG. 1B, the lens will be identified via identifier 22. As shown in FIG. 1B, the first side 24 defines an aspheric-toric surface 32. In one example, the aspheric-toric surface 32 corresponds to a generally-saddle shaped surface. In one aspect, the aspheric-toric surface 32 includes a top central portion 34 extending between a pair of opposite upper edges 38. In another aspect, the top central portion 34 extends generally in a first orientation (represented by line F) corresponding to a first radius of curvature (represented by dashed line R1) of the aspheric-toric surface 32. In one aspect, in the first orientation, the top central portion 34 defines a generally concave portion of the aspheric-toric surface 32 of lens 22.

In another aspect, as viewed from a second orientation (generally parallel to line S), a combination of the top central portion 34 and a pair of side portions 35 disposed on opposite sides of the top central portion 34 together generally define a convex portion of the aspheric-toric surface 32 of lens 22. Moreover, each respective side portion 35 includes opposite outer edges 36A, 36B that each extend in a curved manner downward (from the upper edges 38) to converge at a junction 40 that is in general alignment with the second orientation (S) of the aspheric-toric surface 32. In another aspect, a second radius of curvature (represented by dashed line R2) of the aspheric-toric surface 32 defines the degree of curvature of the convex surface aligned in the second orientation (S).

In another aspect, while not defining a structural boundary or operative feature of lens 22, line 42 shown in FIG. 1B schematically represents a termination of the portion of lens 22 defining the aspheric-toric surface 32. Moreover, as further described later in association with FIGS. 5-8, line 42 further represents a junction at which the first side 24 of lens 22 intersects with mounting flange 103 (not shown in FIG. 1B).

In one aspect, top central portion 34 includes a center (C) of aspheric-toric surface 32, which is aligned with a center of the spherically-shaped second side 26 of lens 22.

Figure 2A:
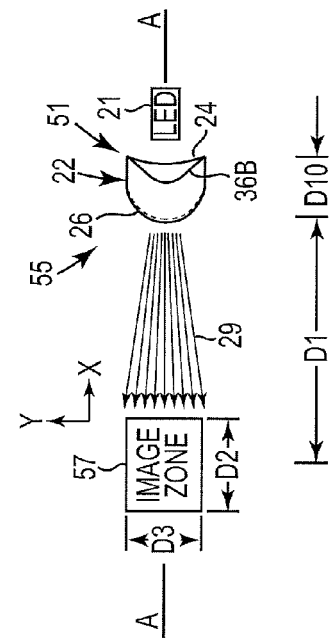
FIG. 2A is a diagram including a side view schematically illustrating an illumination assembly, according to one example of the present disclosure.

FIG. 2A is a diagram 50 including a side view schematically illustrating an illumination assembly 51, according to one example of the present disclosure. As shown in FIG. 2A, the illumination assembly 51 includes lens 22 and an illumination source 21. As further shown in the top view in FIG. 2B of the illumination assembly 51, in one example, the illumination source 21 includes a light emitting diode (LED). With further reference to the side view in FIG. 2A, the illumination source 21 and lens 22 are aligned along a central axis (A) of illumination relative to a to-be-imaged surface 28. In one aspect, with this arrangement, light received from the illumination source 21 (such as an LED) is generally emitted in an orientation in front of lens 22 and in front of the LED (instead of the sides of the LED or lens) such that substantially all light emitted from the LED is sent to a to-be-imaged surface along the central axis (A) of illumination.

In one aspect, because the illumination assembly 51 is located laterally (along the x orientation) from the to-be-imaged surface 28 as shown in FIG. 2A, this central axis (A) of illumination is oriented at an acute angle (θ) relative to a plane (P) through which the to-be-imaged surface 28 extends. The plane P extends in both the x and y directions noted in the legend (N).

In one example, the acute angle (θ) generally corresponds to an incident angle of light 29 that will strike the to-be-imaged surface 28. In one aspect, this arrangement mitigates glare reflected from the to-be-imaged surface. In another aspect, by orienting the illumination assembly in this way, a low profile imaging system is achievable that consumes less vertical space (in the z orientation) within a larger structure or within a standalone device.

In one aspect, as shown in FIG. 2A, because of the acute angle (θ) of incidence, the light 29 naturally tends to spread out on the to-be-imaged surface 28 along the x orientation (and therefore along plane P), such that the to-be-imaged surface 28 is fully and uniformed illuminated in the x orientation.

Figure 2B:
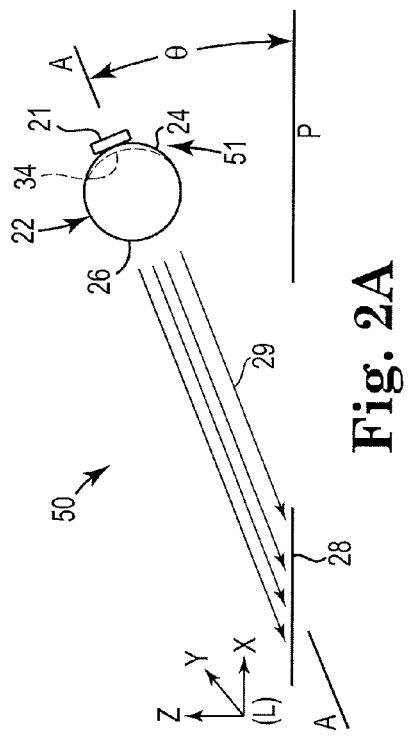
FIG. 2B is a diagram including a top view schematically illustrating an illumination assembly, according to one example of the present disclosure.

FIG. 2B is a diagram 55 including a top view of the illumination assembly 51, according to one example of the present disclosure. As shown in FIG. 2B, a center of the illumination source 21 (e.g. a LED in one example) and a center of lens 22 are aligned along the central axis (A) of illumination that extends through an imaging zone 57. Illumination emitted from source 21 is shaped as it passes through lens 22 and is directed toward the imaging zone 57, at which at a to-be-imaged surface is positionable.

In one aspect, the imaging zone 57 represents an area (at a distance D1 from the illumination assembly 51) at which light 29 exiting second side 26 of lens 22 is directed and which becomes generally uniformly illuminated.

In some examples, the imaging zone 57 corresponds to a physical structure and along with illumination assembly 51, the imaging zone 57 forms part of an imaging system. In some examples, an imaging system includes the illumination assembly 51 but the imaging zone 57 does not correspond to a physical structure and therefore, the imaging zone does not form a component of the imaging system.

In one example, the imaging zone 57 includes a length along the x orientation (represented by distance D2) and a width along the y orientation (represented by distance D3). In some examples, a length and a width of imaging zone 57 is about 5 millimeters each. In some examples, a size of the imaging zone 57 corresponds to a portion of a document.

In one aspect, the concavity of the top central portion 34 of the aspheric-toric surface 32 of lens 22 shapes the trajectory of light (emitted from LED of illumination source 21) to spread light in the y orientation of the imaging zone 57, without otherwise increasing the spread of light in the x orientation. This arrangement ensures better uniformity of illumination of imaging zone 57 in both the x and y orientations than would otherwise occur in the absence of the aspheric-toric surface 32 associated with the lens 22 according to examples of the present disclosure.

In one example, the imaging zone 57 has a length (D2) of about 5 millimeters and a width (D3) of about 5 millimeters. In this example, the lens 22 has diameter of about 6 millimeters and the LED 21 has a radiant surface of about 1 millimeter by 1 millimeter. In one example, the second side of the lens 22 of illumination assembly 51 is spaced apart from a center of the imaging zone 57 by a distance (D1), such as but not limited to 5 millimeters. In another aspect, the lens 22 has a length (D10). A combined distance of D1 and D10 generally corresponds to a distance of the LED 21 away from a center of the imaging zone 57, assuming that a radiant surface of the LED 21 is positioned in close proximity to top central portion 34 of the aspheric-toric surface 32.

As previously mentioned, in some examples, the illumination source 21 comprises a light emitting diode (LED). In one example, the LED-based illumination source 21 emits white light. In one example, the illumination source 21 comprises a high lumen flux, flash-type LED, such as a Flash 6 product obtainable under the LUXEON® brand from the Phillips Lumileds Lighting Company. The illumination source 21 provides sufficient light to obtain a high resolution image of the to-be-imaged surface 28.

Figure 3A:
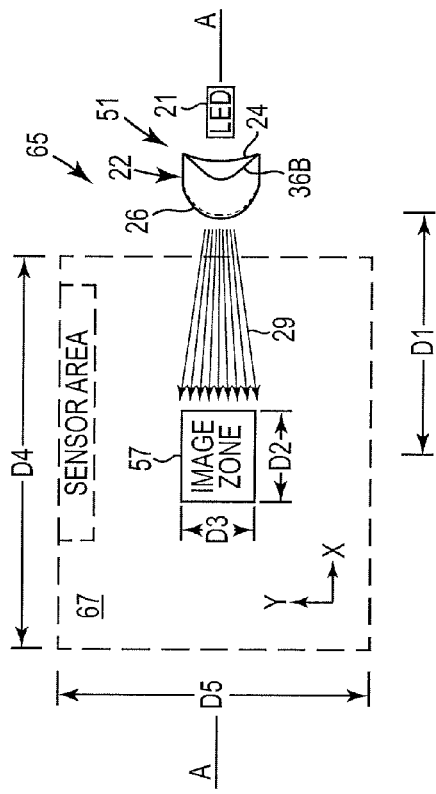
FIG. 3A is a diagram including a side view schematically illustrating an imaging system, according to one example of the present disclosure.
Figure 3B:
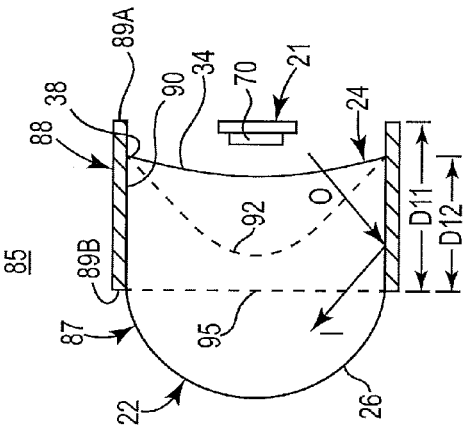
FIG. 3B is a diagram including a top view schematically illustrating an imaging system, according to one example of the present disclosure.

FIGS. 3A and 3B are side and top views of an imaging system, according to one example of the present disclosure, including illumination assembly 51. FIG. 3A is a side view like FIG. 2A, except further depicting the imaging module 62 and FIG. 3B is a top view like FIG. 2B, except further depicting a sensor area 67 associated with the imaging module 62.

As shown in FIG. 3A, imaging module 62 includes a sensor mechanism 64 that is vertically disposed above the to-be-imaged surface 28. In some examples, the sensor mechanism 64 includes a charge coupled device (CCD) image sensor. In some examples, the sensor mechanism 64 includes a complementary metal oxide semiconductor (CMOS)-type image sensor. In some examples, a single lens structure or an array of lens and/prisms is interposed between the CCD or CMOS-based imaging device and the to-be-imaged surface 28. In one example, these interposed lens components comprise a symmetrical optical relay 65, such as a Dyson relay or an Offner relay. In one example, the imaging module 62 includes an assembly including a symmetrical optical relay and a CMOS-type image sensor that has substantially the same features and attributes as the relay and image sensor disclosed in U.S. 2012-0051602, titled IMAGING A PRINT ABERRATION, and published on Mar. 1, 2012.

In one example, the illumination assembly 51 (including a lens and illumination source) is coupled to the imaging module 62 to form an imaging system. In some examples, this imaging system is stationary and a media is moved relative to the stationary imaging system. In some examples, this imaging system is mobile such that the imaging system is moved relative to a to-be-imaged surface. In one example, the imaging system is incorporated into a carriage assembly that moves back and forth relative to a media. In one aspect, the carriage assembly also carries a printhead. In some examples, the imaging system is mobile and incorporated into a hand-held scanning device.

In one example, imaging module 62 includes or is associated with an electronic controller and other components for operating an imaging system, as further described later in association with FIG. 9.

With further reference to FIG. 3B, in one example, sensor mechanism 64 (FIG. 3A) provides a sensor area 67. In one aspect, sensor area 67 has a length (D4) and a width (D5) such that the sensor area 67 is about 5 to 10 times the area of the imaging zone 57. Among other features, this relationship enables obtaining a high resolution image of the to-be-imaged surface 28, which in turn aids in detecting and identifying microscopic intentional and/or unintentional printing artifacts on the to-be-imaged surface 28. In one aspect, these printing artifacts appear on a portion of a printed document and their identification is used as part of an authentication scheme or anti-counterfeiting scheme. In some examples, the resolution achieved via the imaging module 62 allows identification and differentiation of printing artifacts having a size on a scale of less than 10 microns.

Figure 4A:
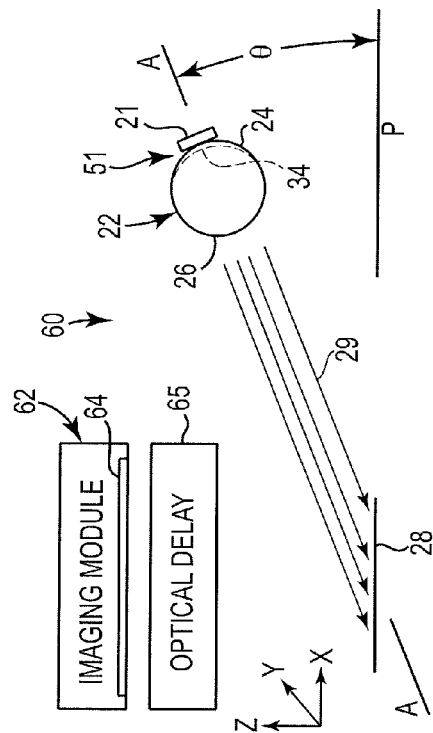
FIG. 4A is a top view schematically illustrating an illumination assembly, according to one example of the present disclosure.

FIG. 4A is a diagram 75 including a side view of an illumination assembly 51, according to one example of the present disclosure. As shown in FIG. 4A, the illumination assembly 51 includes a lens 22 and a light emitting diode (LED) as an illumination source 21. In one example, the illumination assembly 51 includes at least substantially the same features and attributes as the illumination assembly 51 as previously described in association with FIGS. 1A-3B.

As shown in FIG. 4A, the concavity defined by the top central portion 34 of the aspheric-toric surface 32 (of first side 24 of lens 22) has a depth (D6) determined according to the first radius of curvature (R1) of the aspheric-toric surface 32 that was previously depicted in FIG. 1B. In one example, with a first radius of curvature (R1) of 10 millimeters, the depth D6 is sufficient that when the illumination source 21 (LED) is secured into close proximity to the top central portion 34 of the aspheric-toric surface 32, substantially all of the light emitted from the radiant surface of the LED is emitted into the concavity of top central portion 34 to be captured for further transmission via lens 22. In this way, the lens 22 greatly enhances the efficiency of the LED as an illumination source 21 because substantially all of the emitted light (from the LED) is directed into the lens 22, and ultimately toward the to-be-imaged surface 28.

In more technical terms, for an LED having a one-half Gaussian angle of beam divergence of 60 degrees and in contact with (or in near contact with) the top central portion 34, the depth (D6) is sufficient for first side 24 of lens 22 to capture substantially all of the light emitted from the LED. In contrast, without the example lens 22 of the present disclosure, the wide beam divergence of the LED typically results in significant wasted emitted light, thereby greatly reducing the efficiency of such illumination systems.

As shown in FIG. 4A, in addition to the depth of the concavity of top central portion 34 (relative to the size of the radiant surface of the LED) contributing to the efficiency of the illumination assembly, the relative diameters (D7, D8) of the aspheric-toric surface 32 of the lens 22 and of the radiant surface 70 of the LED further contribute to this efficiency. In particular, because the diameter (D7) of the aspheric-toric portion 32 of the lens 22 is substantially greater than a dimension (D8) of the radiant surface 70 of the LED, the assembly ensures that the top central portion 34 of the lens 22 receiving the emitted light will be substantially wider than the diameter of beam divergence from the radiant surface 70 of the LED, as shown in FIG. 4A.

Figure 4B:
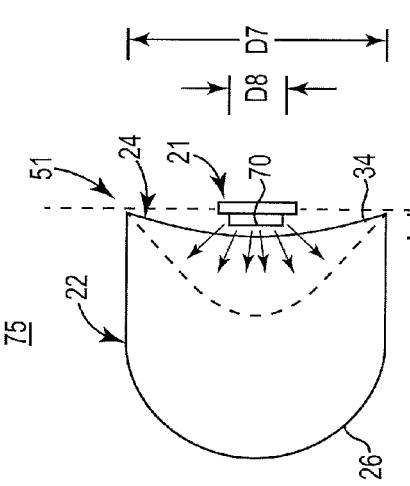
FIG. 4B is a top view schematically illustrating an illumination assembly, according to one example of the present disclosure.

FIG. 4B is a diagram 85 including a sectional view of a lens assembly 87, according to one example of the present disclosure. As shown in FIG. 4B, the lens assembly 87 comprises substantially the same features and attributes as the lens 22 (part of illumination assembly 51) shown in FIG. 4A, except with lens assembly 87 further including a reflective collar 88. In one aspect, collar 88 includes a first end 89A and an opposite second end 89B. For illustrative clarity, sectional hatching is shown for the collar 88, but has been omitted from the lens 22 to better illustrate the trajectory of the rays of emitted light as they become incident to, and reflected from, a side wall 30 of the lens 22 because of the presence of the collar 88 as described further below.

In one example, in general terms collar 88 is a generally cylindrical, sleeve that is sized and shaped to fit snugly about an outer side wall 30 of lens 22. In some examples, collar 88 is slidably mountable and positionable along a length of lens 22. In some examples, an inner side wall 90 of the collar 88 is made of, and/or coated with, a reflective material, a white material, or Lambertian scattering coating so that a portion of light emitted from the LED 21 that is on an outward trajectory (represented by line O) is reflected or scattered internally (represented by line I) within lens 22 and generally in the direction toward the to-be-imaged surface 28 (FIGS. 2A, 3A).

In one aspect, FIG. 4B depicts a curved dashed line 92 that represents and generally corresponds to the outer curved edges 36A, 36B of the opposite side portion 35 of the aspheric-toric surface 32 (FIG. 1B). In another aspect, the straight dashed line 95 shown in FIG. 1B represents a linear, bottom edge of the collar 88, and its position generally corresponds to a junction between the spherical lens portion (second side 26 of lens 22) and the cylindrical body 25 of the lens.

In some examples, the side wall 90 of collar 88 has a length (D11) greater than a distance (D12) that is measured from a position corresponding to line 95 to the upper edges 38 of the first side 24 of lens 22. In one aspect, with end 89A of side wall 90 of collar 88 extending beyond the edges 88 of first side 24 of lens 22, the collar 88 better ensures that any light emitted from radiant surface 70 of LED 21 is reflected or scattered internally within and through lens 22 and ultimately directed toward to-be-imaged surface at image zone 57.

In some examples, while not shown in FIG. 4B, it will be understood that end 89A of side wall 90 of collar 88 terminates adjacent upper edges 38 of the first aspheric-toric surface 32 of first side 24 of lens 22.

It will be further understood that in some examples, the collar 88 is not limited to use with the example lens 22 shown in FIG. 4B, but is deployable in the same form or similar forms with other examples lenses and lens assemblies of the present disclosure that are described and illustrated throughout the present disclosure.

FIGS. 5-8 provide various views of a lens assembly 100, according to one example of the present disclosure.

FIG. 5 is a front view of the lens assembly 100. As shown in FIG. 5, lens assembly 100 includes a lens 102 and a mounting flange 103. In one example, the lens 102 comprises at least substantially the same features and attributes as lens 22, as previously described in association with FIGS. 1A-4B, with like reference numerals referring to like elements. For example, as shown in FIG. 5, each respective side portion 135 includes opposite outer edges 136 that each extend in a curved manner downward (from the upper edges 138) to converge at a junction 140 that is in general alignment with the second orientation (S) of the aspheric-toric surface 132.

In one aspect, lens 102 includes a first portion 104 defining a first side and a second portion 106 defining a second side opposite the first side. The mounting flange 103 is a generally disc shaped member that generally encircles and is secured about a side wall 130 of the lens 102. The mounting flange 103 is positioned between the first portion 104 and the second portion 106 of the lens 102. The mounting flange 103 includes a first edge portion 110, an opposite, second edge portion 112, and a flat edge portion 114 extending between the respective first and second edge portions 110, 112. In general terms, the mounting flange 103 enables mounting a center of the lens 102 in precise alignment relative to a center of an illumination source 21 (e.g. LED in FIGS. 2A, 2B), and thereby ensure alignment of the lens 102 and the illumination source 21 along a central axis (A) of illumination, that was previously depicted in at least FIGS. 2A, 2B. Further details regarding mounting flange 103 are described later in association with FIGS. 6-8.

As previously described in association with lens 22, first portion 104 of lens 102 generally defines a cylindrical lens portion having an aspheric-toric surface 132 for receiving emitted light from the illumination source.

In one example, the mounting flange 103 is sized and/or shaped to accommodate the presence of a collar (such as collar 88 of FIG. 4B) about the body of the lens 102.

FIG. 6 is a perspective view further schematically illustrating the lens assembly 100. Among other features, FIG. 6 further depicts the generally saddle-shaped contour of the aspheric-toric surface 132. Dashed line 139 denotes the convex portion of the aspheric-toric surface 132 corresponding to the second radius of curvature and which is generally aligned with the second orientation (S).

Moreover, as further shown in FIG. 6, mounting flange 103 includes an array of holes 122A, 122B, 122C, 122D for mounting the lens assembly 100 into position relative to an illumination source 21 (e.g. LED) and along a central axis (A) of illumination (FIGS. 2A-3B). As further shown in FIG. 6, mounting flange 103 includes a curved edge portion 116 that extends in a generally circumferential manner between the first edge portion 110 and second edge portion 112 of flange 103.

FIG. 7 is a bottom, right, perspective view further highlighting the generally spherically-shaped, second portion 106 of lens 102 and its relationship to mounting flange 103, according to one example of the present disclosure. FIG. 8 is a bottom plan view further schematically illustrating the mounting flange 103, which includes a hollow receiving ring 150 sized and shaped to encircle and to be secured about outer side wall 130 of lens 102. In some examples, the ring 150 is centrally positioned between the first and second outer portions 110, 112 and adjacent flat edge portion 114, as shown in FIG. 8.

Figure 9:
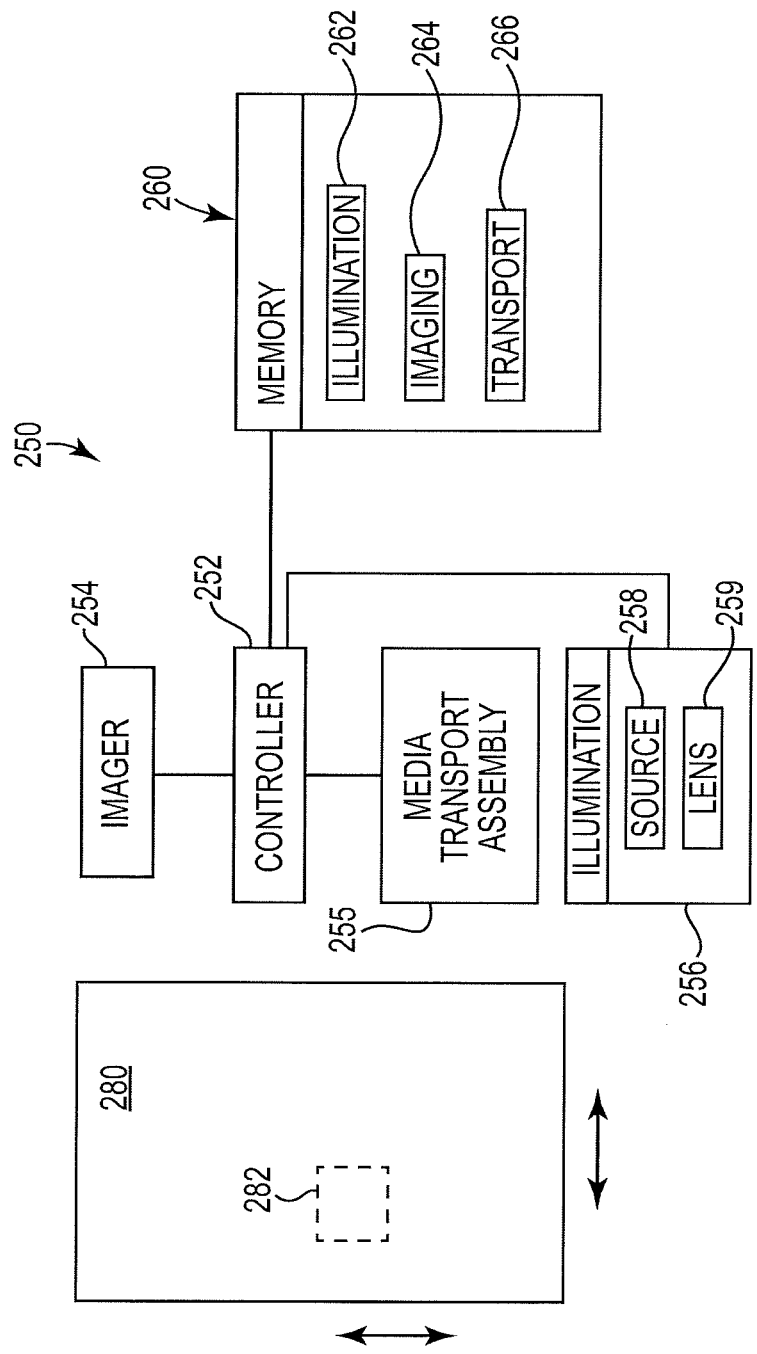
FIG. 9 is a block diagram schematically illustrating an imaging system, according to one example of the present disclosure.

FIG. 9 is a block diagram schematically illustrating an imaging system 250, according to one example of the present disclosure. As shown in FIG. 9, imaging system 250 includes a controller 252, imager 254, media transport assembly 255, illumination assembly 256, and memory 260. The illumination assembly 256 includes an illumination source 258 and a lens 259. In some examples, the imaging system 250 includes an imaging zone 282 corresponding to a physical structure onto which a media 280 is placed. In some examples, the imaging system 250 includes a imaging zone 282 that does not correspond to a physical structure (onto which a media is placed) but rather the imaging zone 282 represents a target area (of media 280) onto which illumination is directed and from which images are obtained.

In one example, the imager 254 and illumination assembly 256 each comprise at least substantially the same features and attributes as the imaging modules (e.g. imaging module 62 and sensor area 67) and illumination assemblies previously described in association with FIGS. 1A-8.

In some examples, media transport assembly 255 is present and deployed when the illumination assembly 256 and imager 254 are stationary. In particular, in this instance, the media transport assembly 255 advances or positions print media 280 relative to the stationary illumination assembly 256 and imager 254 to enable media 280 to be positioned relative to imaging zone 282. In some examples, media transport assembly 255 is not activated or is omitted, such as when illumination assembly 256 and imager 254 are movable relative to the print media 280 and when movement of the illumination assembly 256 and imager 254 act to position imaging zone 282 relative to media 280.

Electronic controller 252 communicates with imager 254, media transport assembly 255, and illumination module 256. In some examples, electronic controller 252 is in further communication with a host system, such as a computer and/or printer.

In one example, electronic controller 252 provides control of illumination module 256 including timing control for illumination of an imaging zone 282, such as a to-be-imaged surface. In one example, controller 252 includes timing control for imager 254 to obtain, in coordination with the illumination source 258, an image of the illuminated to-be-imaged surface. As such, electronic controller 252 operates on instructions stored in memory 260 to achieve the timing control and to process the image. In one embodiment, logic and imaging circuitry forming a portion of electronic controller 252 is located on imager 254, media transport assembly 255, and/or illumination assembly 256. In another embodiment, logic and drive circuitry is located remotely from imager 254, media transport assembly 255, and/or illumination assembly 256.

In general terms, controller 252 comprises at least one processor and associated memories that are in communication with memory 260 to generate control signals directing operation of at least some components of the systems and components described in association with at least FIGS.

1A-9. In particular, in response to or based upon commands received via a user interface and/or machine readable instructions (including software) contained in the memory 260, controller 252 generates control signals directing operation of an illumination assembly and/or an imaging system in accordance with at least some of the previously described examples of the present disclosure. In one example, controller 252 is embodied in a general purpose computer and communicates with an imaging system while in other examples, controller 252 is incorporated within an imaging system.

For purposes of this application, in reference to the controller 252, the term "processor" shall mean a presently developed or future developed processor (or processing resources) that executes sequences of machine readable instructions (such as, but not limited to, software) contained in a memory. Execution of the sequences of machine readable instructions, such as those provided via memory 260, causes the processor to perform actions, such as operating controller 252 to provide timed illumination on a to-be-imaged surface in a manner generally described in at least some examples of the present disclosure. The machine readable instructions may be loaded in a random access memory (RAM) for execution by the processor from their stored location in a read only memory (ROM), a mass storage device, or some other persistent storage or non-volatile form of memory, as represented by memory 260. In one example, memory 260 comprises a computer readable medium providing non-volatile storage of the machine readable instructions executable by a process of controller 252. In other examples, hard wired circuitry may be used in place of or in combination with machine readable instructions (including software) to implement the functions described. For example, controller 252 may be embodied as part of at least one application-specific integrated circuit (ASIC). In at least some examples, the controller 252 is not limited to any specific combination of hardware circuitry and machine readable instructions (including software), nor limited to any particular source for the machine readable instructions executed by the controller 252.

In one example, memory 260 includes an illumination module 262, an imaging module 264, and a transport module 266, as well as instructions for coordinating operation of the respective modules with each other. The illumination module 262 includes instructions for operating illumination assembly 256, imaging module 264 includes instructions for operating imager 254, and transport module 266 includes instructions for operating media transport assembly 255 (when applicable).

Figure 10:
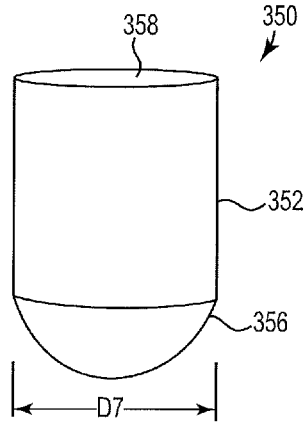
FIG. 10 is a front plan view schematically illustrating a component for producing a lens, according to one example of the present disclosure.

FIG. 10 is a front view of a lens component 350, according to one example of the present disclosure. As shown in FIG. 10, lens component 350 includes a generally cylindrical body 352 having a first generally spherical end portion 356 and a second generally flat end portion 358. In one example, lens component 350 is an injection molded material. In some examples, the material is a polymethylmethacrylate (PMMA) material. In some examples, the lens component 350 is made of other transparent injection moldable materials.

Figure 11:
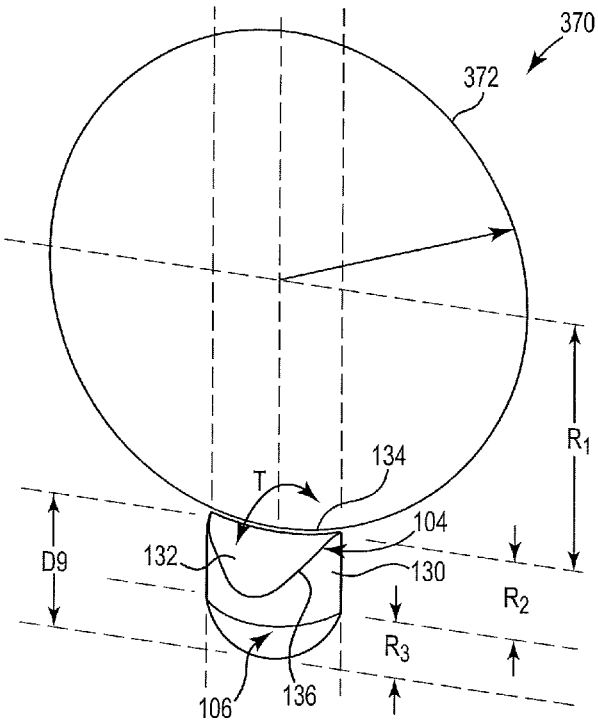
FIG. 11 is a diagram including a perspective view schematically illustrating the manufacture and geometry of a lens, according to one example of the present disclosure.

FIG. 11 is a diagram 370 including a perspective view schematically illustrating manufacture of a lens, according to one example of the present disclosure. As shown in FIG. 11, a circle 372 represents a shape and size of a cutting tool positioned to revolve (represented by directional arrow T) in the pattern of a toroid to cut the generally flat end portion 358 of lens component 350 (FIG. 10) into the aspheric-toric surface 132 shown in FIG. 11.

After application of the cutting tool, the resulting product has substantially the same features as lens 102, and therefore the reference numerals associated with lens 102 are employed in FIG. 11. In one aspect, R1 in diagram 370 of FIG. 11 represents a radius of circle 372 and a first (or major) radius of curvature of the toroid (and therefore of the aspheric-toric surface 132) created via application of the toroidal cutting tool. In another aspect, R2 in diagram 370 represents a radius about which the toroidal cutting tool revolves to make the cut of aspheric-toric surface 132 and corresponds to a second (or minor) radius of curvature of the toroid, and therefore a second radius of curvature of the aspheric-toric surface 132 of lens. In one aspect, as shown in FIG. 11, R3 represents a radius of the spherical portion 356 while D9 represents the length of the lens. In one example, R1 is about 10 millimeters, while R2 is about 3 millimeters, and D9 is about 5 millimeters.

Figure 12A:
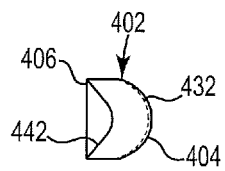
FIG. 12A is a side view schematically illustrating a lens, according to one example of the present disclosure.

FIG. 12A is a side view schematically illustrating a lens 402, according to one example of the present disclosure. In one example, as shown in FIG. 12A, lens 402 includes at least substantially the same features and attributes as lens 22, 102, as previously described in association with at least FIGS. 1A-11, except further including a second aspheric-toric surface 442 to define a second side 406 of the lens 402 opposite a first side 404 of the lens having a first aspheric-toric surface 432. However, as shown in FIGS. 12A-12B, the major radius of curvature of the second aspheric-toric surface 442 on the second side 406 is oriented orthogonally (rotated 90 degrees) relative to the major radius of curvature of the first aspheric-toric surface 432 on the first side 404.

In one aspect, the additional aspheric-toric surface 442 on the second side 406 of lens 402 acts to further shape light emitted from lens 402 to further shape light (exiting from second side 406 of lens 402) relative to the imaging zone 452. In particular, one instance in which this additional aspheric-toric surface 442 is deployed is when the top central portion (like top central portion 34 in FIG. 1B) of first aspheric-toric surface 432 has a deep concavity to better surround or partially enclose the radiant surface of the LED 21 (and therefore the light emitted from the radiant surface).

However, in some instances, the depth of this concavity in first aspheric-toric surface 432 could potentially produce a greater than desired widening of light beam 29 in the y orientation. In such a scenario, the presence of the orthogonally oriented of the second aspheric-toric surface 442 on second side 406 of lens 402 (relative to the orientation of the first aspheric-toric surface 432) would mitigate the optical effects of the relative severity of the depth of concavity of the top central portion of the first aspheric-toric surface 432. Stated differently, with second aspheric-toric surface 442 having a relatively shallower depth of concavity than first aspheric-toric surface 432 and with second aspheric-toric surface 442 being oriented orthogonally relative to first aspheric-toric surface 432, the second aspheric-toric surface 432 acts to modulate the degree of widening of light beam 29 in the y orientation to a desired amount.

Accordingly, the intensity of illumination at imaging zone 452 is enhanced and greater efficiency is obtained in terms of the amount of light produced by the LED 21 and the amount of light directed into the imaging zone 452. It will be understood that, in this example, the first aspheric-toric surface 432 still acts to increase the beam divergence of light 29 in a single orientation (e.g. along the y orientation) to more uniformly illuminate the imaging zone 452.

Figure 12C:
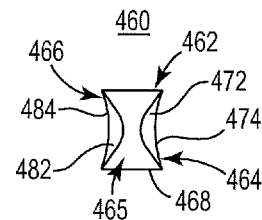
FIG. 12C is a top view schematically illustrating a lens, according to one example of the present disclosure.
Figure 12B:
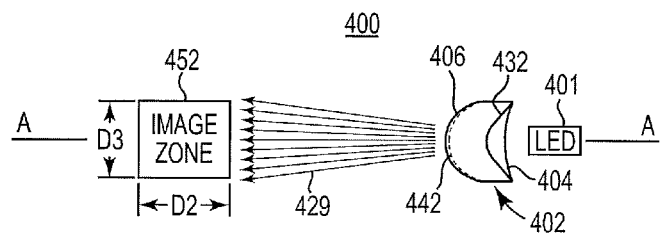
FIG. 12B is a top view schematically illustrating an illumination assembly, according to one example of the present disclosure.

FIG. 12C is a diagram 460 including a top plan view schematically illustrating a lens 462, according to one example of the present disclosure. As shown in FIG. 12C, lens 462 includes at least substantially the same features and attributes as lens 22, 102, as previously described in association with at least FIGS. 1A-11, except further including a second aspheric-toric surface 482 to define a second side 466 of the lens 402 opposite a first side 464 of the lens 462 having a first aspheric-toric surface 472 (like aspheric-toric surface 32 in FIGS. 1A-11). As shown in FIG. 12C, the major radius of curvature of the second aspheric-toric surface 482 on the second side 466 of lens 462 is oriented generally parallel to and in alignment with the major radius of curvature of the first aspheric-toric surface 472 on the first side 464. In some examples, the respective first and second aspheric-toric surfaces 472 and 482 are disposed on opposite end portions of a generally cylindrical body 465 having a side wall 468.

In one aspect, lens 462 enables apportioning an amount of desired diffraction (to obtain a desired amount of light beam widening) among two different aspheric-toric surfaces 472, 482 instead of a single aspheric-toric surface 32 (e.g. FIGS. 1A-11). Among other features, this arrangement enables reducing an intensity of a degree of curvature of the top central portion of each respective aspheric-toric surface 472, 482 to thereby reduce a depth of concavity of those respective aspheric-toric surfaces 472, 482, as compared to a depth of concavity of a single aspheric-toric surface 32 to achieve the same general amount of beam widening.

In one example, use of a lens 462 having dual, opposite aspheric-toric surfaces is deployed when the acute incidence angle (θ in FIG. 2A, 3A) would be relatively small (i.e. less than 25 degrees, in one example). In such a scenario, a lens using a single aspheric-toric surface (e.g. 32 in FIGS. 1A-11) would include a depth (D6 in FIG. 4A) of such a magnitude to cause edges 38 of the aspheric-toric surface 32 to physically interfere with the LED 21. To avoid this situation, lens 462 is used in place of lens 22 because the dual aspheric-toric surfaces 472, 482 enable apportioning the desired depth of concavity on opposite sides of the lens 462, and thereby reducing the depth (D6 in FIG. 4A) of the top central portion of aspheric-toric surface 472 on first side 474, which in turn prevents physical interference of top central portion (or its outer edges) of aspheric-toric surface 472 with portions of LED 21.

Figure 13:
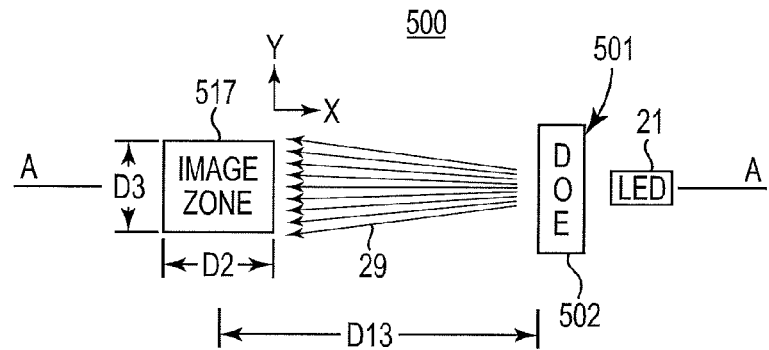
FIG. 13 is a diagram including a top view schematically illustrating an illumination assembly, according to one example of the present disclosure.

FIG. 13 is a diagram 500 including a top plan view schematically illustrating an illumination assembly 501, according to one example of the present disclosure. In one example, the illumination assembly 501 includes substantially the same features and attributes as the illumination assembly 51 (as previously described in association with FIGS. 2A, 2B), except for replacing lens 22 with a shaping element and, more specifically, with a diffractive optical element (DOE) assembly 502. Like lens 22, DOE assembly 502 causes an increased divergence of light pattern 29 in a single orientation (along the y orientation), namely, in an orientation generally perpendicular to the central axis (A) of illumination. This shaping of the light pattern 29 helps to achieve a generally symmetric illumination on the to-be-imaged surface (at imaging zone 557) to prevent an asymmetric illumination (of the to-be-imaged surface) that would otherwise occur due to the acute incident angle (such as θ in FIG. 3B) associated with the central axis (A) of illumination. In one aspect, the DOE assembly 502 comprises at least one diffractive optical element sized and shaped of an appropriate material to produce the above-described beam shaping in which a beam of light 29 is widened in a single orientation.

Figure 14:
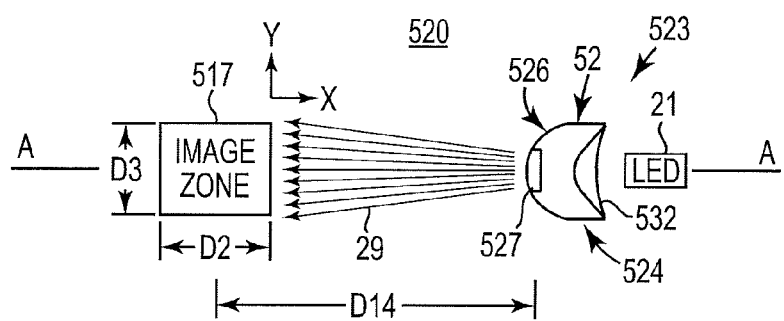
FIG. 14 is a diagram including a top view schematically illustrating an illumination assembly, according to one example of the present disclosure.

FIG. 14 is a diagram 520 including a top plan view schematically illustrating an illumination assembly 523, according to one example of the present disclosure. In one example, the illumination assembly 523 includes substantially the same features and attributes as the illumination assembly 51 (as previously described in association with FIGS. 2A, 2B), except for replacing lens 22 with a lens 522. Like lens 22, the lens 522 causes an increased divergence of light pattern 29 in a single orientation (along the y orientation), namely, in an orientation generally perpendicular to the central axis (A) of illumination.

In one example, lens 522 comprises at least substantially the same features as lens 22, except for the second side 526 including a spherical surface portion including at least one diffractive optical element (DOE) 527 incorporated within, and exposed generally at, a central outer surface of the spherical surface portion of second side 526 of lens 532.

In addition to the increased beam divergence caused by first aspheric-toric surface 532 of first side 524 of lens 522, in one example the diffractive optical element (DOE) is formed in a manner to enhance shaping of the light 29 by increasing the widening effect of beam divergence already caused by aspheric-toric surface 532.

In one aspect, the diffractive optical element (DOE) 527 also enables independently adjusting a focus location of different components (red, green, blue) of the white light emitted from LED 21. In some examples, among other effects, this arrangement enhances color-specific illumination of certain to-be-imaged surfaces via adjusting chromatic aberration associated with having two lens surfaces.

Figure 15:
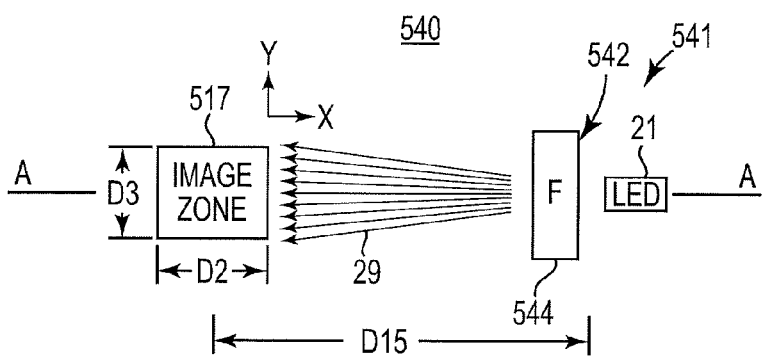
FIG. 15 is a diagram including a top view schematically illustrating an illumination assembly, according to one example of the present disclosure.

FIG. 15 is a diagram 540 including a top plan view schematically illustrating an illumination assembly 541, according to one example of the present disclosure. In one example, the illumination assembly 541 includes substantially the same features and attributes as the illumination assembly 51 (as previously described in association with FIGS. 2A, 2B), except for replacing lens 22 with a Fresnel lens 542. Like lens 22, the Fresnel lens 542 causes an increased divergence of light pattern 29 in a single orientation (along the y orientation), namely, in an orientation generally perpendicular to the central axis (A) of illumination. This shaping of the light pattern 29 helps to achieve a generally symmetric illumination on a to-be-imaged surface to prevent an asymmetric illumination (of the to-be-imaged surface) that would otherwise occur due to the acute incident angle associated with the central axis (A) of illumination. In one aspect, the Fresnel lens 542 comprises an array of Fresnel zones sized, placed, and oriented to produce the above-described beam shaping in which a beam of light 29 is widened in a single orientation.

Among other features, a generally flat Fresnel lens 542 enables a distance (D15) between a center of imaging zone 517 and LED 21 to be reduced relative to other lens types (e.g. spherical, aspherical, etc.) that have a higher profile. This decreased distance (D15) allows the LED 21 to be closer to imaging zone 517, and thereby further enhancing the intensity of illumination (e.g. light 29) reaching imaging zone 517.

Figure 19:
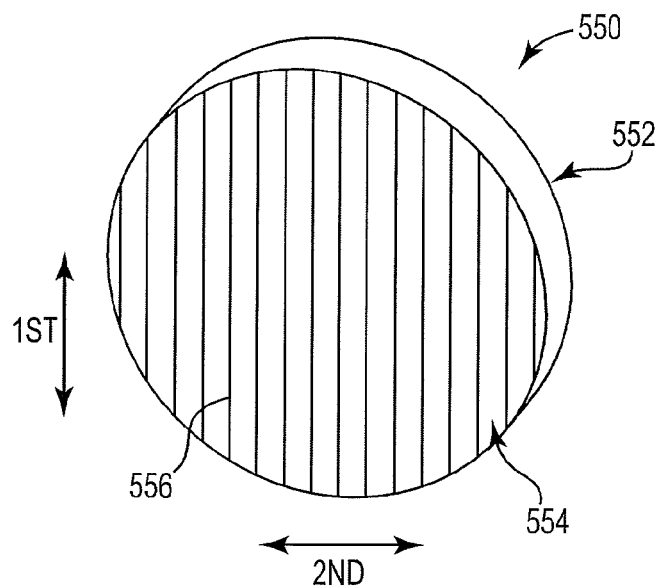
FIG. 19 is a diagram including a perspective view schematically illustrating a Fresnel lens, according to one example of the present disclosure.

In one example, the Fresnel lens 542 comprises a cylindrical or toric-type Fresnel lens 550, as shown in FIG. 19, and which includes features to cause an increased divergence of light pattern 29 in a single orientation (along the y orientation), namely, in an orientation generally perpendicular to the central axis (A) of illumination. FIG. 19 is a perspective view of Fresnel lens 550, according to one example of the present disclosure. As shown in FIG. 19, in general terms, Fresnel lens 550 comprises a generally flat or disc-shaped member, and includes a first side 552 and a second side 554 with an array of surface features 556 extending generally parallel to each other and extending in a single orientation that is generally parallel to a first orientation ($1^{st}$). With this orientation of surface features 556, light passing through Fresnel lens 550 is shaped (e.g. widened) in a single orientation (e.g. $2^{nd}$ orientation) without being shaped in the first orientation ($1^{st}$) that is orthogonal to the $2^{nd}$ orientation. In this way, the Fresnel lens 550 acts in a manner similar to the previously-described aspheric-toric surface 32 (FIGS. 1B-1C, 2A-2B) for selectively widening a beam of light 29.

Figure 20:
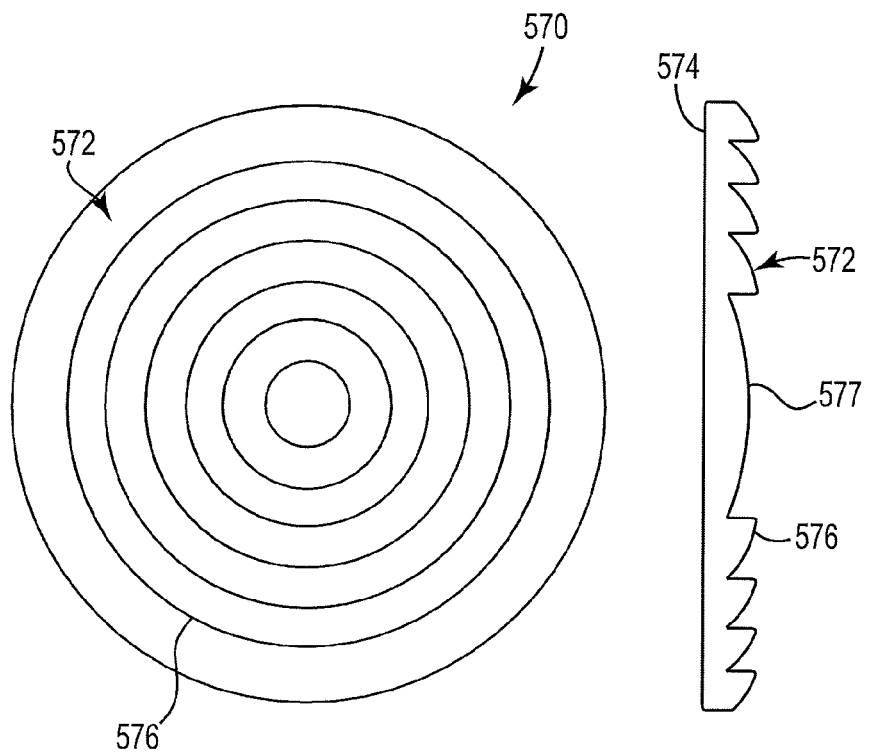
FIG. 20 is a diagram including a front view and a side view schematically illustrating a Fresnel lens, according to one example of the present disclosure.

Moreover, in some examples, in addition to having a lens portion like Fresnel lens 550, Fresnel lens 542 further includes an additional Fresnel lens 570 as shown in FIG. 20. This additional Fresnel lens 570 produces an optical effect that is substantially similar to a spherical surface, such as spherical portion of second side 26 shown in at least FIG. 1C, except that Fresnel lens 550 is generally thinner (i.e. has a lower profile) than the spherical lens portion of second side 26 of lens 22. FIG. 20 includes a front view and a side view schematically illustrating Fresnel lens 570, according to one example of the present disclosure. As shown in FIG. 20, Fresnel lens 570 includes a first side 572 and a second side 574 with first side 572 having an array of surface features 576 arranged concentrically about a central portion. In one aspect, this Fresnel lens 570 acts like a spherical lens (from an optical performance standpoint), but takes up much less space.

Accordingly, in some examples a first Fresnel lens 550 is combined with the additional or second Fresnel lens 570 to provide a relatively low profile lens, which in some instances, enables placement of the LED 21 closer to the imaging zone 517, which in turn enables a greater intensity of illumination to be placed on imaging zone 517. This, in turn, can facilitate better imaging and increases the efficiency of illumination.

In one such example, the Fresnel lens 570 (FIG. 20) would define a first side of a lens and the Fresnel lens 550 (FIG. 19) would define a second side of a lens with the first side of the lens facing the LED 21 to receive illumination from the LED 21. The second side (Fresnel lens 550) would provide the beam shaping effects to generally widen the divergence of light 29 in the y orientation relative to imaging zone 517.

Figure 16:
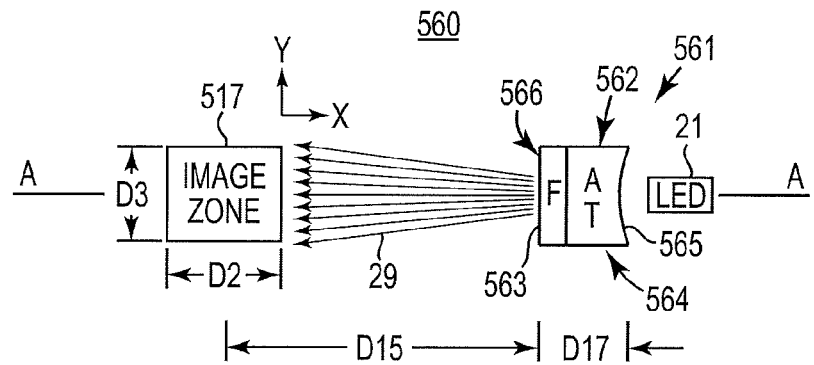
FIG. 16 is a diagram including a top view schematically illustrating an illumination assembly, according to one example of the present disclosure.

FIG. 16 is a diagram 560 including a top plan view schematically illustrating an illumination assembly 561, according to one example of the present disclosure. In one example, the illumination assembly 561 includes substantially the same features and attributes as the illumination assembly 51 (as previously described in association with FIGS. 2A, 2B), except for lens replacing lens 22. As shown in FIG. 16, lens 562 includes at least substantially the same features and attributes as lens 22, 102, as previously described in association with at least FIGS. 1A-11, except including a Fresnel lens 563 to define a second side 566 of the lens 562 opposite a first side 564 of the lens 562 having a first aspheric-toric surface 565 (like aspheric-toric surface 32 in FIGS. 1A-11). By replacing the higher profile spherical portion (e.g. second side 26 in FIG. 2A, 2B) with the Freznel lens 563 in FIG. 16 (which is a generally flat or thin element), a distance (D16) from a center of imaging zone 517 to the front edge of the Fresnel lens 563 shown in FIG. 16 is less than a distance (D1 in FIG. 2B) from a center of imaging zone 57 to the front edge of the spherical surface of second side 26 of lens 22, as shown in FIG. 2A. Stated in other terms, because an overall length (D17) of the lens 562 is less than a length (D10 in FIG. 2B), the reduced sized lens 562 enables the LED 21 to be placed closer to the imaging zone 517 (FIG. 16).

Accordingly, in one aspect, the Fresnel lens 563 in lens 562 provides a low profile (dimension along central axis (A) of illumination) to enable reducing a distance of the LED 21 from the imaging zone 517. This distance reduction, in turn, provides a more compact illumination assembly, and a more compact imaging assembly. In another aspect, by reducing the profile of the lens, a higher intensity of light 29 can be conveyed from LED 21 onto imaging zone 51.

Figure 17:
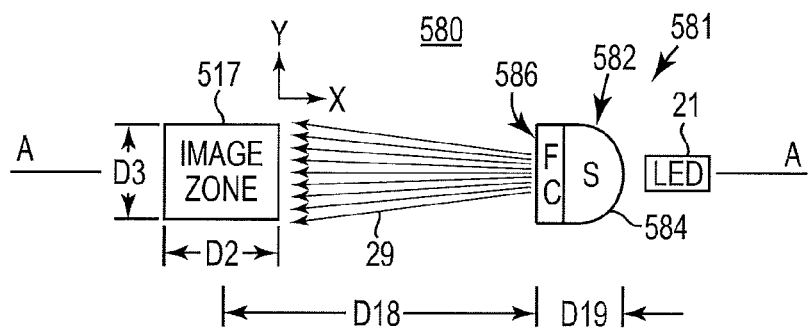
FIG. 17 is a diagram including a top view schematically illustrating an illumination assembly, according to one example of the present disclosure.

FIG. 17 is a diagram 580 including a top plan view schematically illustrating an illumination assembly 581, according to one example of the present disclosure. In one example, the illumination assembly 581 includes substantially the same features and attributes as the illumination assembly 51 (as previously described in association with FIGS. 2A, 2B), except for lens 582 replacing lens 22. As shown in FIG. 17, lens 582 includes a first side 584 defining a spherical surface (S) and an opposite, second side 586 including a cylindrical-based Fresnel lens (represented as F C).

Like lens 22, the Fresnel lens (F C) causes an increased divergence of light pattern 29 in a single orientation (along the y orientation), namely, in an orientation generally perpendicular to the central axis (A) of illumination. This shaping of the light pattern 29 helps to achieve a generally symmetric illumination on a to-be-imaged surface (at imaging zone 517) to prevent an asymmetric illumination (of the to-be-imaged surface) that would otherwise occur due to the acute incident angle associated with the central axis (A) of illumination. In one aspect, the Fresnel lens (F C) comprises Fresnel zones sized, placed, and oriented to result in optical power along a single axis to produce the above-described beam shaping in which a beam of light 29 is widened in a single orientation.

In a manner substantially similar to the example lens 562 in FIG. 16, the generally flat Fresnel lens (F C) 582 in FIG. 17 acts to reduce the overall profile (i.e. length D19) of the lens (along the central axis (A) of illumination) to thereby reduce a distance (D18) of LED 21 from the imaging zone 517.

Figure 18:
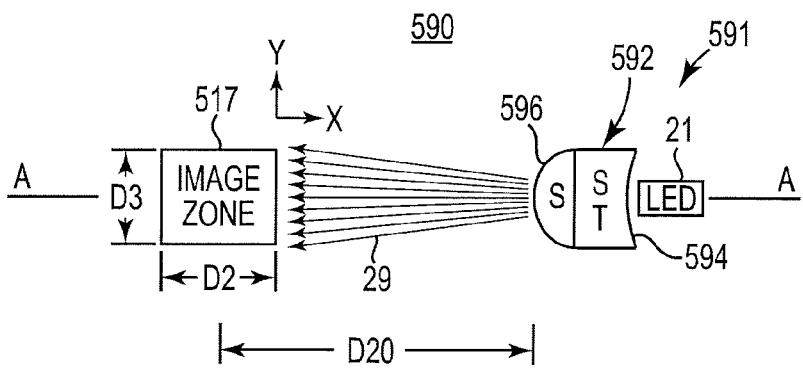
FIG. 18 is a diagram including a top view schematically illustrating an illumination assembly, according to one example of the present disclosure.

FIG. 18 is a diagram 590 including a top plan view schematically illustrating an illumination assembly 591, according to one example of the present disclosure. In one example, the illumination assembly 591 includes substantially the same features and attributes as the illumination assembly 51 (as previously described in association with FIGS. 2A, 2B), except for lens 592 replacing lens 22. As shown in FIG. 16, lens 592 includes at least substantially the same features and attributes as lens 22, 102, as previously described in association with at least FIGS. 1A-11, except including an a spheric-toric portion (S T) to define a first side 594 of the lens 592 opposite a second side 596 (which has a spherical surface as in FIG. 2A). Like lens 22, the spheric-toric lens 592 causes an increased divergence of light pattern 29 in a single orientation (along the y orientation), namely, in an orientation generally perpendicular to the central axis (A) of illumination. This shaping of the light pattern 29 helps to achieve a generally symmetric illumination on a to-be-imaged surface to prevent an asymmetric illumination (of the to-be-imaged surface) that would otherwise occur due to the acute incident angle associated with the central axis (A) of illumination. In one aspect, the relatively simpler shape of the spheric-toric surface on first side 594 is manufacturable at a lower cost and with greater ease than manufacture of an aspheric-toric surface 32 (FIGS. 1A-11). However, unlike the aspheric-toric surface 32 of lens 22 (FIGS. 1A-11), the spheric-toric surface on first side 594 provides relatively fewer degrees of freedom to focus light onto imaging zone 517 of FIG. 18, and therefore does not provide as great a relative increase in efficiency and uniformity in illumination.

Figure 21:
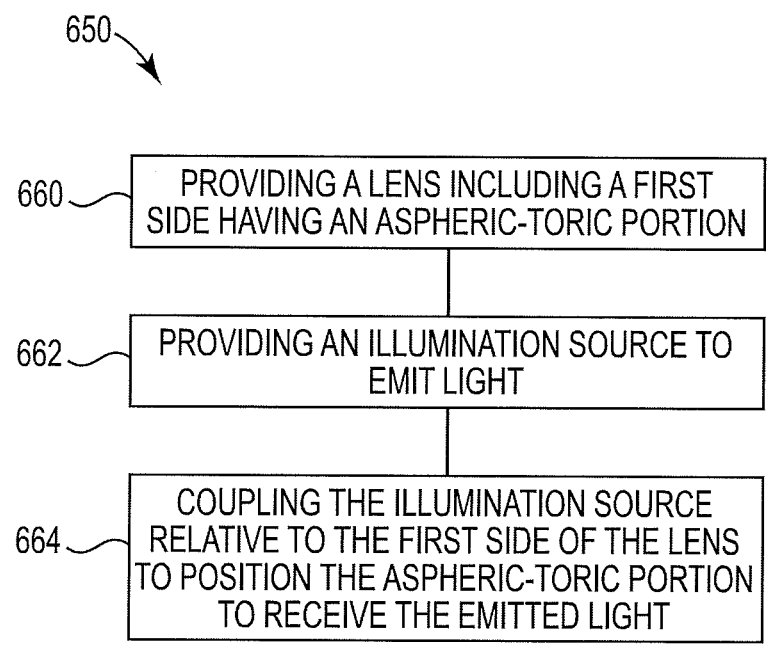
FIG. 21 is a flow diagram schematically illustrating a method of manufacturing an illumination assembly, according to one example of the present disclosure.

FIG. 21 is a flow diagram 650 schematically illustrating a method 652 of manufacturing an illumination assembly, according to one example of the present disclosure. In some examples, method 652 is performed via at least some of the components, elements, assemblies, systems, as previously described in association with FIGS. 1-20. In some examples, method 652 is performed via at least some components, elements, assemblies, systems other than those previously described in association with FIGS. 1-20. As shown in FIG. 21, at 660 method 652 includes providing a lens including a first side having an aspheric-toric portion and a second side opposite the first side, and at 662 method 652 includes providing an illumination source to emit light.

In one aspect, in this context the term "providing" does not necessarily mean actual manufacturing of the lens but can include merely obtaining a lens and/or merely preparing the lens for coupling relative to an illumination source. Similarly, in one aspect, in this context the term "providing" does not necessarily mean actual manufacturing of the illumination source but can include merely obtaining an illumination source and/or merely preparing the illumination source for coupling relative to a lens.

At 664, method 652 includes coupling the illumination source relative to the first side of the lens to position the aspheric-toric portion to receive the emitted light and to cause increased divergence of a beam of the emitted light, after exiting the second side of the lens, in a single orientation relative to a to-be-imaged surface. In one aspect, the single orientation is generally parallel to a major radius of concave curvature of the aspheric-toric portion.

At least some examples of the present disclosure provide for greater uniformity and efficiency in illuminating a surface to be imaged. In one example, a shaping element is positioned to receive light from a light source and to direct the light to a surface to be imaged. The shaping element is provided to cause an increased beam divergence in a single orientation, with the single orientation being generally perpendicular to the central axis of illumination. In one aspect, the illumination source and shaping element are aligned along the central axis of illumination at an acute angle of incidence of the central axis of illumination relative to the to-be-imaged surface.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein.

The invention claimed is:

1. An illumination assembly comprising:
a lens including a first side having an aspheric-toric portion and a second side opposite the first side, with the aspheric-toric portion to receive light emitted by an illumination source with a center of the lens aligned with a central path of illumination toward a target zone spaced apart from the second side of the lens to cause increased divergence of a beam of the emitted light, after exiting the second side of the lens, in a single orientation relative to the target zone, wherein the single orientation is generally parallel to a major radius of concave curvature of the aspheric-toric portion, wherein the central path forms an acute angle of incidence relative to the target zone, and wherein the central path generally corresponds to a second orientation that is generally perpendicular to the single orientation.

2. The illumination assembly of claim 1, wherein the aspheric-toric portion defines a generally saddle-shaped member.

3. The illumination assembly of claim 1, wherein the second portion includes a spherical convex shape.

4. The illumination assembly of claim 3, wherein the second side of the lens includes an aspheric-toric portion having a major radius of curvature generally perpendicular to the major radius of curvature of the aspheric-toric portion of the first side of the lens.

5. The illumination assembly of claim 1, wherein the aspheric-toric portion of the first side of the lens defines a top central portion having a diameter that is substantially wider than a radiant surface of an illumination source and the top central portion has a depth greater than a height of the radiant surface of the illumination source.

6. The illumination assembly of claim 1, wherein the lens includes a generally cylindrical body portion interposed between the first side and second side of the lens, and illumination assembly further comprising:
a generally disc-shaped mounting flange secured about an outer side wall of the cylindrical body portion, the mounting flange positioned to cause alignment of the center of the lens with the central axis of illumination.

7. The illumination assembly of claim 1, comprising:
an illumination source to direct light toward the aspheric-toric portion of the first side of the lens.

8. The illumination assembly of claim 7, wherein the illumination source comprises a light emitting diode.

9. The illumination assembly of claim 8, wherein the light emitting diode includes a generally square shape from which the light is emitted.

10. An imaging system comprising:
a light emitting diode to emit light;
a shaping element including a first lens portion oriented to receive the emitted light, to direct the emitted light toward an imaging zone along a central axis of illumination forming an acute incidence angle relative to the imaging zone, and to shape the emitted light to have an increased divergence in a single orientation relative to the imaging zone, wherein the single orientation is generally perpendicular to a central axis of illumination, wherein the first lens portion includes a major radius of concave curvature generally parallel to the single orientation, and wherein the major radius of curvature has a degree of curvature in proportion to a value of the acute incidence angle; and
an imaging module to obtain an image, at the imaging zone, of a surface to be imaged.

11. The imaging system of claim 10, the imaging module includes a symmetric optical relay and a digital image sensor.

12. The imaging system of claim 10, wherein the shaping element includes a first side facing a radiant surface of the light emitting diode and an opposite second side facing away from the radiant surface, wherein the shaping element is selected from the group including:
the shaping element including the first side having a spheric-toric surface and the second side including a spherical surface; and
the shaping element including the first side having an aspheric-toric surface and the second side including an aspheric-toric surface.

13. The imaging system of claim 10, wherein the light emitting diode includes a generally symmetric shape from which the light is emitted.

14. The imaging system of claim 10, wherein the first lens portion includes an aspheric-toric shape.

15. An imaging system comprising:
a light emitting diode to emit light;
a shaping element to receive the emitted light, to direct the emitted light toward an imaging zone along a central axis of illumination forming an acute incidence angle relative to the imaging zone, and to shape the emitted light to have an increased divergence in a single orientation relative to the imaging zone, wherein the single orientation is generally perpendicular to a central axis of illumination, wherein the shaping element includes a first side facing a radiant surface of the light emitting diode and an opposite second side facing away from the radiant surface, wherein the shaping element is selected from the group including:

the shaping element including the first side having an aspheric-toric surface and the second side including a Fresnel lens;

the shaping element including the first side having a spherical surface and the second side including a spherical surface incorporating at least one diffractive optical element (DOE); and the shaping element including the first side having a spherical surface and the second side including a single-axis-power Fresnel lens; and an imaging module to obtain an image, at the imaging zone, of a surface to be imaged.

16. A method of manufacturing an illumination assembly, comprising:

providing a lens including a first side having an aspheric-toric portion and a second side opposite the first side;

providing an illumination source to emit light and aligning the illumination source and the lens along a central path of illumination toward a target zone, wherein the central path forms an acute incident angle relative to the target zone;

coupling the illumination source relative to the first side of the lens to position the aspheric-toric portion to receive the emitted light and to cause increased divergence of a beam of the emitted light, after exiting the second side of the lens, in a single orientation relative to a target zone, the single orientation being generally parallel to a major radius of concave curvature of the aspheric-toric portion, wherein the central path generally corresponds to a second orientation that is generally perpendicular to the single orientation.

17. The method of claim 16, providing the aspheric-toric portion to define a top central portion having a diameter that is substantially wider than a radiant surface of an illumination source and the top central portion having a depth greater than a height of the radiant surface of the illumination source.

18. The method of claim 16, wherein the second side of the lens includes a spherical-convex portion, and a cylindrical body portion is interposed between the spherical convex portion and the aspheric-toric portion.

19. The method of claim 16, comprising:

securing a collar to encircle, and be in contact against, an outer side wall of the cylindrical body portion of the lens, the collar having a reflective surface facing the outer side wall.

* * * * *